United States Patent [19]
Bloom

[11] 3,745,767
[45] July 17, 1973

[54] FUEL CONTROL APPARATUS FOR GAS TURBINE ENGINES

[75] Inventor: Joseph Lewis Bloom, Droitwich, England

[73] Assignee: Joseph Lucas (Industries) Limited, Birmingham, England

[22] Filed: Sept. 23, 1971

[21] Appl. No.: 183,058

[52] U.S. Cl. .......................................... 60/39.28 T
[51] Int. Cl. ............................................. F02c 9/10
[58] Field of Search ..................... 60/39.28 T, 39.28

[56] References Cited
UNITED STATES PATENTS
2,541,805  2/1951  Berkey ........................... 60/39.28 T
3,006,143  10/1961  Cowles ............................ 60/39.28 T Primary Examiner—Clarence R. Gordon
Attorney—Holman & Stern

[57] ABSTRACT

A fuel control apparatus for a gas turbine engine comprises a metering orifice and a closure member for the orifice. The closure member is movable in response to engine speed and pressure signal from the engine compressor. The pressure signal is modified by a device sensitive to engine temperature. At engine temperatures above a predetermined level the device also modifies the position of the closure member directly and in a sense opposite to that applied by the modification of the pressure signal.

13 Claims, 1 Drawing Figure

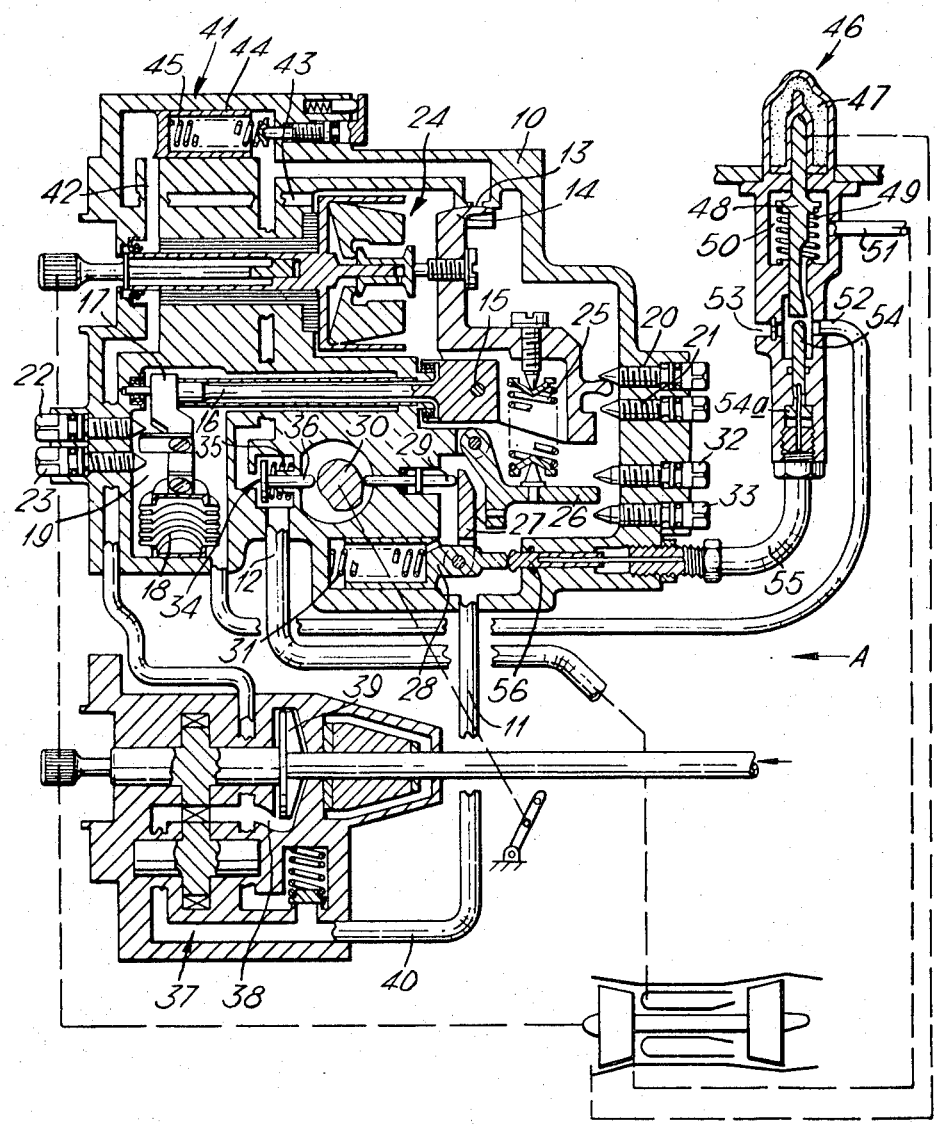

FUEL CONTROL APPARATUS FOR GAS TURBINE ENGINES

This invention relates to a fuel control apparatus for a gas turbine engine and has as an object to provide such an apparatus in a convenient form.

According to the invention a fuel control apparatus for a gas turbine engine comprises a fuel metering orifice, a control element operable to vary the effective area of the orifice in accordance with increases in desired and actual engine speeds respectively to increase and decrease fuel flow and in accordance with increase in an air pressure signal derived, in use, from the engine compressor to increase fuel flow, a device responsive to the temperature at a desired location on the engine, valve means actuable by the device to increase the value of the said air pressure signal with increase in the said temperature and a linkage operable by the device with increases in the said temperature above a predetermined level to urge the control element to reduce fuel flow.

An example of fuel control apparatus according to the invention will now be described with reference to the accompanying drawing which shows such an apparatus diagrammatically.

A casing 10 has an inlet 11 and an outlet 12. Between the inlet 11 and outlet 12 is an orifice 13 whose effective area is controlled by a closure member 14 formed to present an L-shaped metering edge to the orifice 13. The closure member 14 is rotatable about a pivot 15 so that clockwise movement of closure member 14, as shown in the drawing operates to reduce the effective area of orifice 13. Pivot 15 is itself mounted on a spindle 16 rotatable within the casing 10 by a lever 17 coupled to a bellows 18. Bellows 18 is situated in a sealed chamber 19 within the casing 10. Rotation of spindle 16 in an anticlockwise direction, viewed on arrow A, also operates to reduce the effective area of orifice 13. Limits of movement of the closure member 14 about the pivot 15 are defined by adjustable stops 20, 21. Limits of movement of the spindle 16 are likewise defined by adjustable stops 22, 23.

The closure member 14 is engaged by a governor mechanism 24 driven, in use, by the associated engine and operable in response to an increase in engine speed to urge the closure member 14 to reduce the effective area of the orifice 13. Closure member is biased against the action of governor mechanism 24 by a spring 25. The force applied by spring 25 is variable by a lever member 26 pivotally mounted in the casing 10 and engaging an abutment 27 which is, in turn, pivotally mounted on a plunger 28 slidable in the casing 10. Abutment 27 is also engaged by a push rod 29 which forms the follower for a cam 30 rotatable by the engine throttle control. The abutment 27 is biased into contact with lever member 26 and a rod 29 by a spring 31 engaging the plunger 28. The limits of travel of the lever member 26 are defined by a pair of adjustable stops 32, 33.

In series with the orifice 13 is a pressurising valve 34 biased by a spring 35 and having a stem 36 engageable with the cam 30. A positive-displacement pump 37 has an inlet 38 communicating, via a boost pump 39, with a fuel tank (not shown). Pump 37 has an outlet 40 communicating with the inlet 11 of the control arrangement. A spill valve 41 is connected to the inlet 38 and outlet 40 of the pump 37 via passages 42, 43 respectively. Valve 41 has a closure member 44 responsive to the pressure drop across the orifice 13 and biased against the said pressure drop by a spring 45.

A device 47 responsive to the temperature in the engine compressor intake includes a temperature-sensitive element 47 having a stem 48 extending therefrom, stem 48 being movable downwardly, as shown, in response to an increase in the temperature sensed by the element 47. Stem 48 is biased against the said downward movement by a spring 49. Stem 48 passes through a chamber 50 having an inlet 51, an outlet 52 communicating with the chamber 19 in the casing 10, and a restricted outlet 53. The stem 48 forms a variable flow restrictor between the inlet 51 and the outlets 52, 53. The device 46 also includes a plunger 54 engageable with the stem 48 and linked via a flexible cable 55 with a further plunger 56 within the casing 10. Plunger 56 abuts plunger 28 and is thus operable by stem 48 to displace plunger 28. A flange 54a on plunger 54 acts to limit the movement thereof under the influence of spring 31.

In use, fuel supplied by the pump 34 passes via inlet 11 to the orifice 13. Closure member 14 is rotated about pivot 15 to an equilibrium position in which the force exerted on member 14 by the governor mechanism 24 is balanced by the force exerted by the spring 25. The stiffness of spring 31 is substantially greater than that of spring 25. Plunger 28 thus adopts a position in which it abuts plunger 56, urging plunger 54 to the limit of travel imposed either by flange 54a or by engagement with stem 48. The air pressure at the delivery of the engine compressor is supplied to the inlet 51 of device 46. The variable flow restrictor formed by the stem 48 combines with the restricted outlet 53 to provide an air potentiometer. An air pressure signal intermediate ambient and compressor delivery pressure is thus applied, via outlet 52 to the chamber 19. The pressure in chamber 19 acts on the outside of the bellows 18 to rotate the spindle 16, an increase in the air pressure signal operating to increase the effective area of orifice 13. The effective area of orifice 13 is thus variable in accordance with engine speed, throttle setting, compressor delivery pressure and compressor intake temperature.

Reduction in the area of orifice 13 results in an increase in pressure upstream thereof. This pressure is applied via passage 43 to one side of closure member 44 of spill valve 41. The pressure downstream of orifice 13 is applied to the other side of closure member 41. The said downstream pressure is maintained substantially constant by the pressurising valve 34. Valve 41 is thus sensitive to a pressure drop across orifice 13 to spill excess fuel back to the inlet 38 of pump 37. In the shut-off position of the engine throttle, cam 30 engages stem 36 to operate valve 34 as a shut-off valve.

If the compressor intake temperature rises sufficiently to cause the stem 48 to engage and move the plunger 54, this movement causes plunger 56 to urge plunger 28 against the spring 31. The abutment 29 thus pivots about push-rod 29 and, via lever 26 and spring 25, permits closure member 14 to move in a direction to reduce fuel flow.

Thus below a predetermined level, increase in temperature at the compressor intake results in an increase in pressure in chamber 19 and hence an increase in fuel flow to the engine. An increase in temperature above this predetermined level urges the closure member 14 to reduce fuel flow to the engine.

I claim:

1. A fuel control apparatus for a gas turbine engine, comprising a fuel metering orifice, a control element operable to vary the effective area of the orifice in accordance with increases in desired and actual engine speeds respectively to increase and decrease fuel flow and in accordance with increase in an air pressure signal derived, in use, from the engine compressor to increase fuel flow, a device responsive to the temperature at a desired location on the engine, valve means actuable by the device to increase the value of the said air pressure signal with increase in the said temperature and a linkage operable by the device with increases in the said temperature above a predetermined level to urge the control element to reduce fuel flow.

2. A fuel control apparatus for a gas turbine engine, comprising a fuel metering orifice, a control element operable to vary the effective area of the orifice in accordance with increases in desired and actual engine speeds respectively to increase and decrease fuel flow and in accordance with increase in an air pressure signal derived, in use, from the engine compressor to increase fuel flow, a device responsive to the temperature at a desired location on the engine, valve means actuable by the device to increase the value of the said air pressure signal with increase in the said temperature, a linkage operable by the device with increases in the said temperature above a predetermined level to urge the control element to reduce fuel flow, and a govenor mechanism responsive to the speed of the engine, the control element being mounted for movement about a first axis by the govenor mechanism.

3. An apparatus as claimed in claim 2 which includes an element responsive to the said air pressure signal, and the control element is mounted for pivotal movement about a second axis by the pressure responsive element.

4. An apparatus as claimed in claim 3 in which the first and second axes are substantially mutally perpendicular.

5. An apparatus as claimed in claim 3 in which the pressure responsive element is a bellows.

6. An apparatus as claimed in claim 2 which includes a spring engaging the control element and biasing the latter against movement by the governor mechanism in response to an increase in engine speed.

7. An apparatus as claimed in claim 6 which includes a lever supporting the end of the spring remote from the control element and pivotally movable by temperature responsive device when the temperature is above said predetermined level to vary the bias applied by the spring.

8. An apparatus as claimed in cliam 7 which includes means responsive to the position of a throttle control for the engine to pivotally move the said lever.

9. An apparatus as claimed in claim 7 in which the temperature responsive device includes a stem which forms a control member for said valve means.

10. An apparatus as claimed in claim 9 which includes a fluid flow restrictor which combines with said valve means to form an air potentiometer, the said air pressure signal being that between the said valve and restrictor.

11. An apparatus as claimed in claim 10 which includes a plunger movable by said stem at temperatures above said predetermined level, and means interengaging said plunger and said lever.

12. An apparatus as claimed in claim 11 in which said interengaging means comprises a further lever pivotally mounted about an axis which is movable by said plunger, said further lever being pivotally movable about its axis by said means responsive to the engine throttle control, and being engaged by the first mentioned lever.

13. An apparatus as claimed in claim 12 in which said interengaging means further comprises a further plunger abutting said further lever and a flexible cable connecting the said plungers.

* * * * *